United States Patent [19]

Kawase

[11] Patent Number: 5,687,302
[45] Date of Patent: Nov. 11, 1997

[54] METHOD OF TRANSFERRING RECORDING DATA TO RECORDING DEVICE

[75] Inventor: Hideo Kawase, Iwate-ken, Japan

[73] Assignee: Alps Electric Co., Ltd., Tokyo, Japan

[21] Appl. No.: 592,038

[22] Filed: Jan. 26, 1996

[30] Foreign Application Priority Data

Jan. 27, 1995 [JP] Japan .................................. 7-011926

[51] Int. Cl.$^6$ .................................................. G06K 15/00
[52] U.S. Cl. ......................................... 395/115; 395/112
[58] Field of Search ................................. 395/101, 112, 395/113, 114, 115, 116, 526, 511, 507, 509, 821, 828, 834, 876, 877, 886, 894; 358/404, 444, 261.4

[56] References Cited

U.S. PATENT DOCUMENTS

| | | | |
|---|---|---|---|
| 4,907,094 | 3/1990 | Mishima et al. | 358/404 |
| 5,068,805 | 11/1991 | Tasuzuki | 395/164 |
| 5,159,681 | 10/1992 | Beck et al. | 395/425 |

*Primary Examiner*—Arthur G. Evans
*Attorney, Agent, or Firm*—Guy W. Shoup; Patrick T. Bever

[57] ABSTRACT

A method of transferring recording data to a recording device for preventing the slowdown of effective recording speed by determining beforehand the available memory capacity of an input device and by transferring the recording data in an optimum manner to the recording device. The available memory capacity of an input device 1 is determined. When the available memory capacity of the input device 1 is sufficient enough to store the recording data of one cycle by the recording head, the recording data of one cycle is transferred to the recording device 2 on a recording cycle basis. When the available memory capacity of the input device 1 is not sufficient enough to store the recording data of one cycle by the recording head, the recording data is transferred to the recording device 2 on an element-by-element basis.

4 Claims, 3 Drawing Sheets

METHOD OF TRANSFERRING RECORDING DATA TO RECORDING DEVICE

BACKGROUND OF THE INVENTION

The present invention relates to a method of transferring recording data to a recording device, and, in particular, to the method of transferring recording data in which the memory capacity of an input device is determined beforehand in comparison to the quantity of recording data so that the recording data is fast processed and transferred to the recording device.

DESCRIPTION OF THE PRIOR ART

Available as recording devices are serial-type recording device where recording is performed by moving in the direction of recording row (hereinafter referred to as scanning direction) a recording head having a plurality of recording elements arrayed in the direction perpendicular to the recording row (hereinafter referred to as subscanning direction). In the serial-type recording device field, the use of a recording device called multi-line type is growing in order to improve effective recording speed that is a processing time between when recording data is input and transferred to a recording device and when recording is actually done. The multi-line type recording device records a plurality of lines in the recording row at a time.

Since the multi-line type recording device handles a large quantity of recording data per one scan in the scanning direction, its memory capacity should be accordingly large.

For example, suppose that a full color recording of eight-inch wide is performed using three color ink ribbons and a recording head of 240-dot recording elements of a resolution of 600 dpi (dot/inch), the recording data per cycle is determined as follows:

$$600 \times 240 \times 8 \times 3 = 2456000 \text{ bytes}$$

The memory capacity of the input device such as a computer that transfers the recording data should be at least this size of memory or larger. The input device that has a sufficient capacity to handle the above-mentioned recording data processes the recording data of a cycle and sends the recording data on a color by color basis in short duration bursts so that the recording device may then perform recording fast and easily.

A large quantity of data to be processed presents no problem, provided that the input device has a sufficient memory.

A memory capacity enough to process the large quantity of recording data may not be available in some input device. To send the recording data to the recording device, such an input device is provided with a second memory in addition to a first memory. The portion of an assembled recording data that is beyond the capacity of the first memory is stored in the second memory as shown in the flow diagram in FIG. 3. In the already-described recording device that records a plurality of lines of recording row in a single recording cycle with three color ribbons, a recording data assembling block and the like in the input device assembles recording data for one recording element at step ST1 in FIG. 3. At step ST2, a determination is made of whether the first memory has a remaining capacity sufficient enough to store the recording data of one recording element assembled at step ST1. If yes, the sequence in FIG. 3 goes to step ST3, where the assembled recording data is stored in the first memory. The sequence then goes to step ST5. If no, namely, if the first memory has no sufficient remaining capacity enough to store one cycle, three color recording data, the sequence goes to step ST4, where the recording data is transferred to the second memory to be stored there. The sequence then goes to step ST5.

At step ST5, a determination is made of whether or not the recording data of one cycle of the three-color ink ribbons is assembled. If no, the sequence returns to step ST1, the recording data on a recording element basis is again assembled. If yes, the sequence goes to step ST6, where the recording data of one cycle is command-formatted before being sent to the recording device. Since there is a possibility that the recording data is stored across both the first and second memories, at step ST6 a determination is made of whether the second memory also stores part of the recording data. If the second memory stores part of the recording data, it is read from the second memory and command-formatted to be sent to the recording device.

The sequence goes to step ST7, where a determination is made of whether the command-formatted recording data of one cycle is fully transferred from the input device to the recording device. If yes, that ends the processing of the recording data of one cycle, and the processing of the recording data of the next cycle or line starts. If no, the sequence goes to step ST6, and the command-formatted recording data of one cycle is continuously sent from the input device to the recording device.

In the above prior art recording data transfer method from the input device to the recording device, however, when the memory capacity of the input device is smaller than the quantity of the recording data, part of the recording data is saved in the second memory. Furthermore, the part of the recording data should be read from the second memory before being sent to the recording device. This incurs an extra time, namely the write time to and the read time from the second memory, and thus, prolongs the time required for sending the recording data to the recording device. As a result, the effective recording speed of the recording device is slowed.

Furthermore, when the second memory has no sufficient memory capacity to transfer the recording data, it cannot handle the recording data at all, and thus no recording data transfer to the recording device is performed.

SUMMARY OF THE INVENTION

The present invention has been developed to solve the above problem in the prior art, and it is an object of the present invention to provide a method of transferring recording data to a recording device, wherein the slowdown of effective recording speed is prevented by determining beforehand the available memory capacity of an input device and by transferring the recording data in an optimum manner to the recording device.

To achieve the above object, as recited in claim 1 later, the method of transferring recording data of a type that allows the recording data to be transferred from the input device to the recording device to perform a cycle of recording by moving in the direction of scanning the recording head having a plurality of recording elements arrayed in the direction of subscanning, comprises the steps of determining the available memory capacity of the input device, transferring the recording data of one cycle of recording by the recording head on a cycle-by-cycle basis when the memory capacity of the input device is greater than the quantity of recording data of one cycle of recording by the recording head, and transferring sequentially the recording data of one recording element on an element-by-element basis when the memory capacity of the input device is smaller than the quantity of recording data of one cycle of recording by the recording head.

In the method of transferring the recording data to the recording device defined by claim 2, according to claim 1, the recording device records simultaneously a plurality of lines of recording row by a single recording cycle.

As recited in claim 3, the method of transferring recording data of a type that allows the recording data to be transferred from the input device to the recording device to perform a cycle of recording by moving in the direction of scanning for each color the recording head having a plurality of recording elements arrayed in the direction of subscanning, comprises the steps of determining the available memory capacity of the input device, transferring the recording data of one cycle of recording by the recording head on a color-by-color and cycle-by-cycle basis when the memory capacity of the input device is greater than the quantity of recording data of one cycle of color recording by the recording head, and transferring sequentially the recording data of one recording element on an element-by-element basis when the memory capacity of the input device is smaller than the quantity of recording data of one cycle by color recording of the recording head.

In the method of transferring the recording data to the recording device defined by claim 4, according to claim 3, the recording device records simultaneously a plurality of lines of recording row by a single recording cycle.

According to the method of transferring the recording data to the recording device, a determination is beforehand made of whether the memory capacity of the input device is greater than the quantity of the recording data. When the available memory capacity is greater than the recording data of one recording cycle, the recording data is transferred to the recording device on a recording cycle basis; and when the available memory capacity is smaller that the recording data of one recording cycle, the recording data is transferred to the recording device on an element-by-element basis.

When a color recording is performed, the recording data is transferred to the recording device on a color recording cycle basis. The recording data is thus transferred to the recording device in the optimum way. The processing time from input of the recording data to actual recording is shortened, thereby preventing the effective recording speed from being slowed down.

DESCRIPTION OF THE PREFERRED EMBODIMENT

Figure 1:
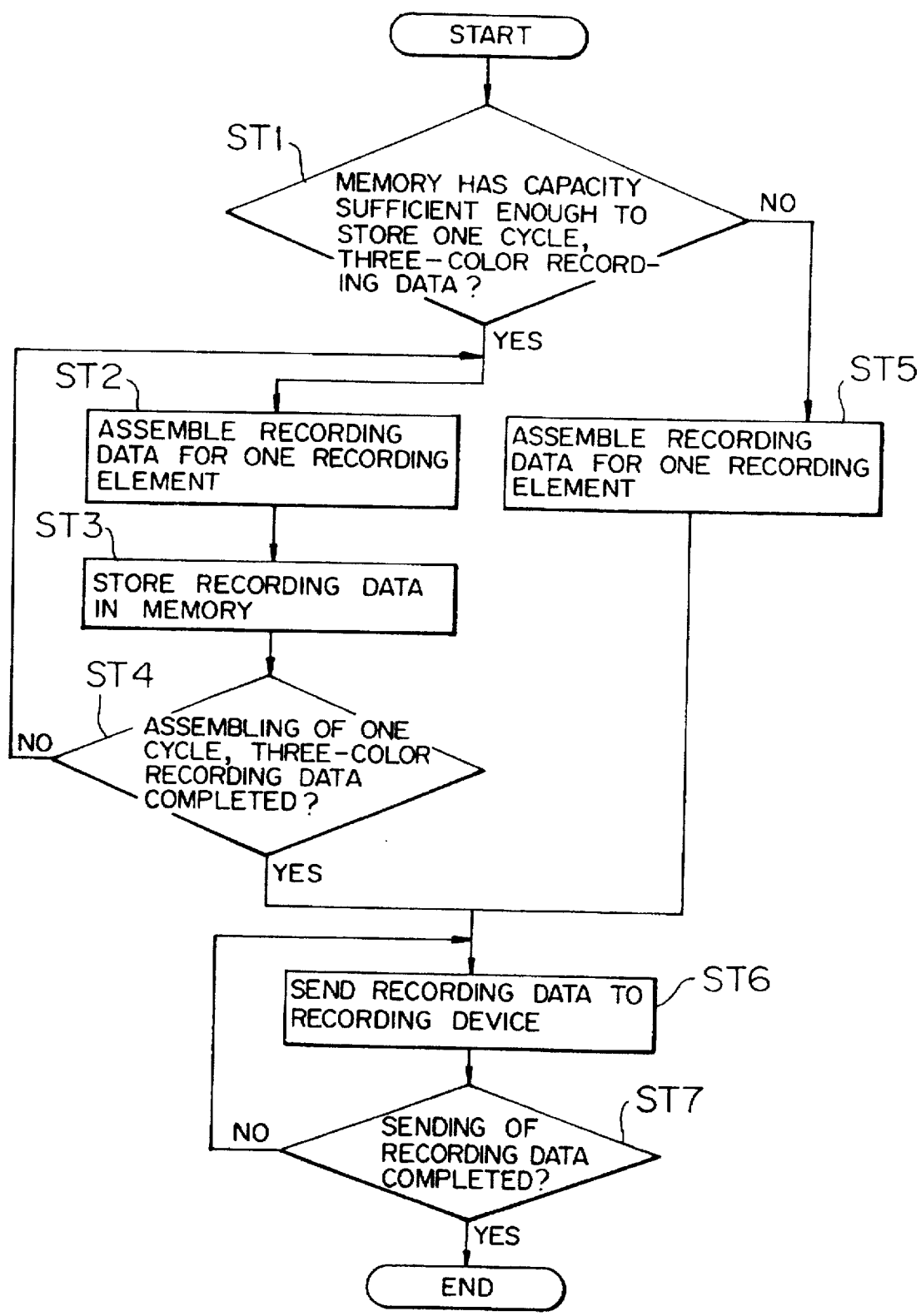
FIG. 1 is a flow diagram showing a method of transferring recording data to a recording device according to an embodiment of the present invention.

Referring now to the drawings, an embodiment of the present invention will be described.

Figure 2:
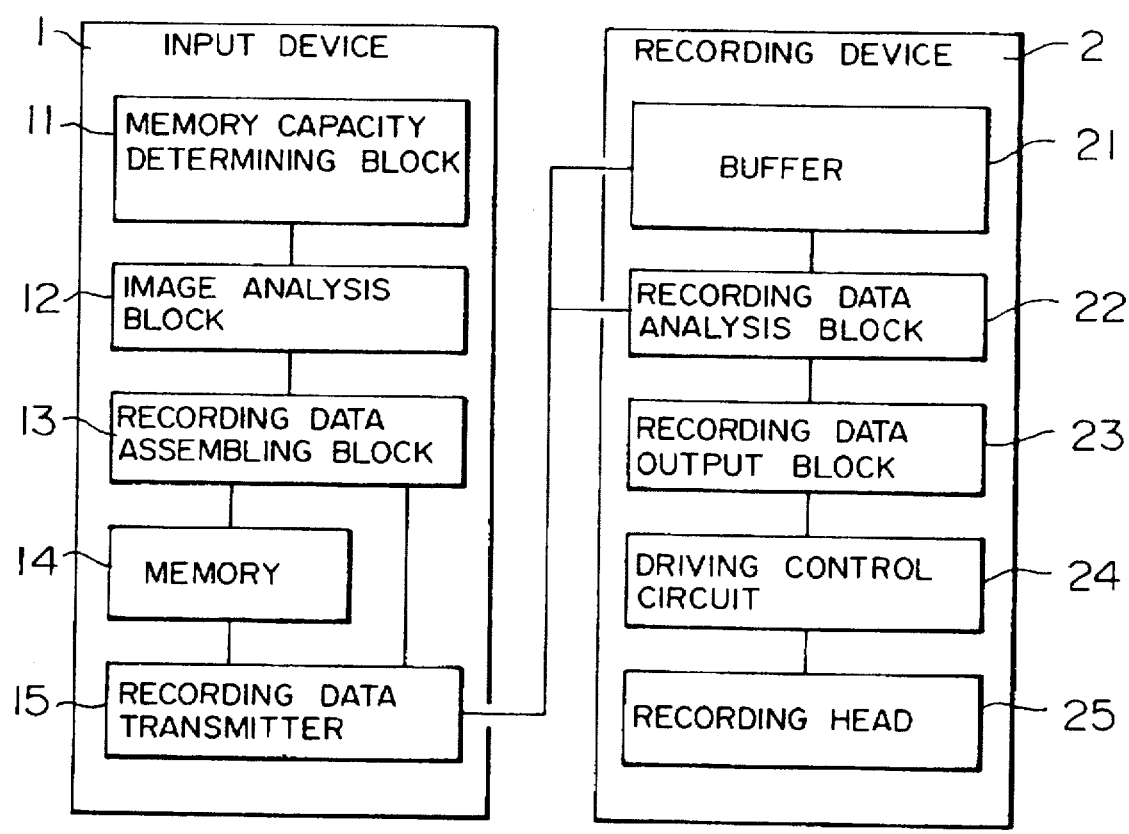
FIG. 2 is a block diagram of a system implementing the flow diagram shown in FIG. 1 according to the embodiment of the present invention.
Figure 3:
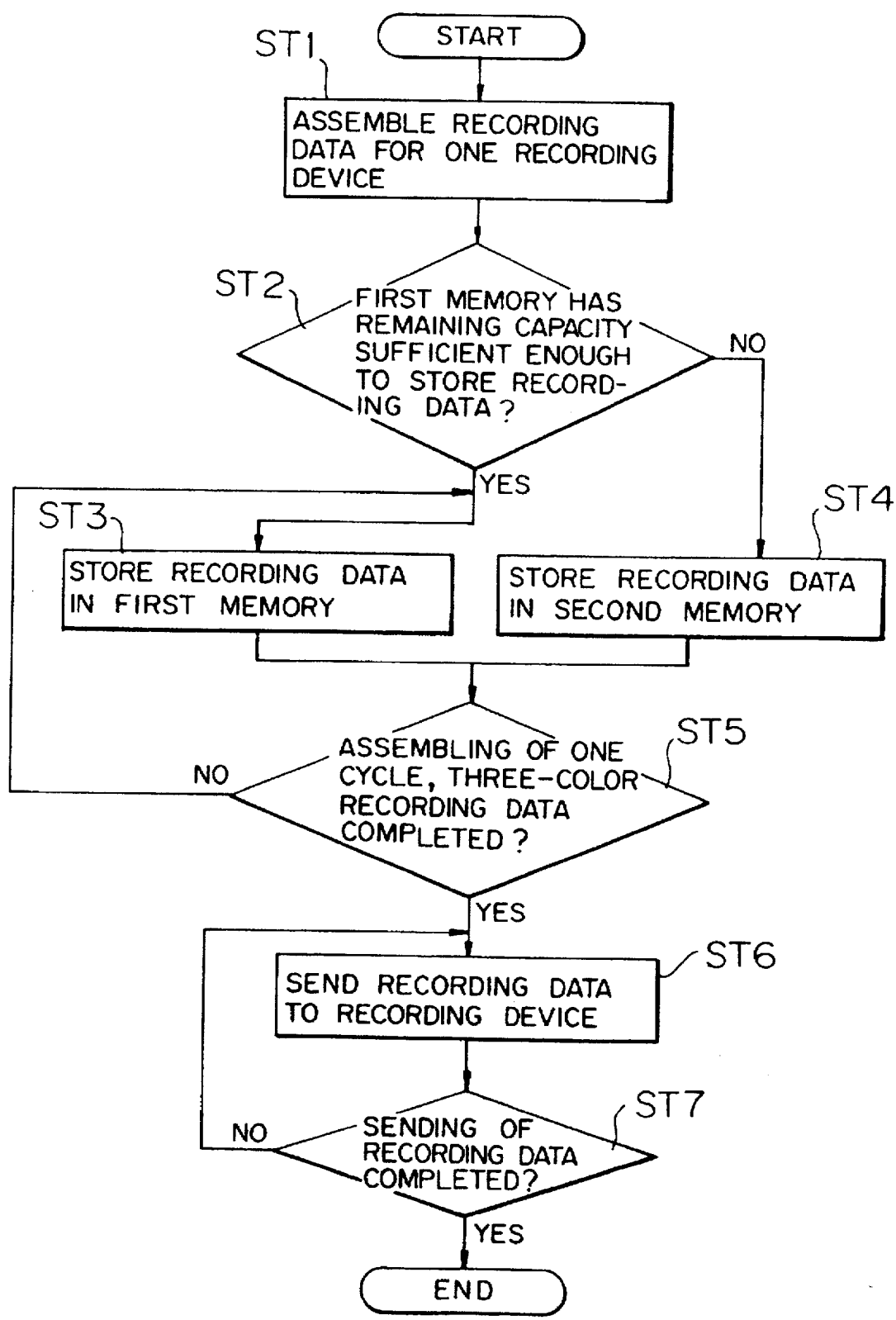
FIG. 3 is a flow diagram showing the prior art method of transferring recording data to a recording device.

FIG. 1 is a flow diagram showing the method of transferring the recording data to the recording device 2 according to the embodiment of the present invention. FIG. 2 shows the construction of a recording system that implements the flow diagram shown in FIG. 1.

This embodiment presents the method of transferring the recording data to the recording device 2 which performs a color recording of a plurality of lines by a single cycle of color recording using three color ink ribbons. A single cycle of color recording herein is made up of three scans, and, to perform three-color recording, therefore, the recording head of the recording device should move three times consecutively in the direction of scanning. Therefore, each single cycle of color recording covers the area of a scan width by the vertical height of the dots of the recording head.

The recording system in FIG. 2 is now discussed. The input device 1 such as a computer is provided with a memory capacity determining block 11. The memory capacity determining block 11 determines beforehand whether a memory 14 has a memory capacity enough to store the recording data of a single cycle for the three color ink ribbons. The input device 1 also comprises an image analysis block 12 for analyzing the image displayed on a CRT screen or the like after the memory capacity determining block 11 has determined the available memory capacity, and a recording data assembling block 13 for assembling recording data for each recording element of a recording head 25 in a recording device 2, based on the analysis result. When the memory capacity determining block 11 indicates that there is available a sufficient capacity, the memory 14 stores sequentially the recording data for one recording element assembled by the recording data assembling block 13 until the full recording data of one cycle for the three color ink ribbons is stored. The input device 1 further comprises a recording data transmitter 15, which command-formats the recording data to send it to the recording device 2 and then actually sends the command-formatted recording data to the recording device 2.

To transfer to the recording device 2, the recording data transmitter 15 is set to the recording cycle transfer mode, in which the recording data transmitter transfers to the recording device 2 the recording data of a color recording cycle for three color ink ribbons on a-one-scan-for-one-color basis when the recording data of one cycle of the three color ink ribbons is smaller than the capacity available in the memory 14.

When no sufficient memory is available in the memory 14, the recording data is coming directly to the recording data transmitter 15 rather than being once stored in the memory 14. The recording data transmitter 15 is set to the recording element transfer mode in which the recording data transmitter 15 transfers the recording data for each recording element to the recording device on an element-by-element basis with no delineation introduced between color recordings.

The recording device 2 has a buffer 21, which stores the recording data that is sequentially coming in from the recording data transmitter 15 in the recording element transfer mode. The buffer 21 should have a capacity sufficient enough to store the recording data of one cycle of three color ribbons.

The recording device 2 comprises a recording data analysis block 22 and a recording data output block 23. The recording data analysis block 22 analyzes the recording data coming in from the recording data transmitter 15 so that the recording device 2 may perform color recording in response to the recording data. The recording data output block 23 outputs the analysis data of the recording data analysis block 22 to the driving control block 24. The recording device 2 performs recording with the recording head 25 in accordance with the analysis result of the recording data.

Discussed referring now to the flow diagram in FIG. 1 is the method of transferring the recording data to the recording device 2 according to the embodiment of the present invention.

At step ST1, the memory capacity determining block 11 determines whether the memory 14 in the input device 1 has a capacity sufficient enough to store the recording data of one cycle of recording by the three color ink ribbons.

If yes, the sequence in FIG. 1 goes to step ST2. If no, the sequence goes to step ST5. At each of both steps, the image analysis block 12 analyzes the image on the CRT screen or the like, and the recording data assembling block 13 assembles the recording data for each recording element of the recording head 25 on an element-by-element basis.

After the recording data is assembled at step ST 2, the sequence goes to step ST 3, where the memory stores the recording data of each recording element on an element-by-element basis. The sequence goes to step ST 4. At step ST 4, a determination is made of whether or not the assembling of one cycle of recording of the three color ink ribbons is completed. If no, the sequence returns to step ST 2, and the assembling and storing of the recording data of each of the recording elements are repeated. If yes, namely, if the recording data of one recording cycle for all the three color ink ribbons is assembled, the sequence goes to step ST 6. At step ST 6, the recording data transmitter 15 command-formats the recording data for the recording device 2. The recording data transmitter 15 transfers the recording data of one cycle to the recording device 2 on a color-by-color basis, when the recording data transmitter 15 is set to the recording cycle transfer mode for the recording data to be processed by recording cycle.

In succession to step ST 6 where the recording data is transferred, the sequence goes to step ST 7. At step ST 7, a determination is made of whether the transfer of the recording data is completed. If yes, the assembling of the recording data for this cycle is completed, and the assembling of the next recording cycle starts. If no, a command is issued to continue the transfer of the recording data.

When the determination at step ST 1 is no, the sequence goes to step ST 5. At step ST 5, the recording data is assembled. The sequence then goes to step ST 6 without storage of the recording data in the memory 14. At step ST 6, the recording data of each recording element is command-formatted by the recording data transmitter 15, where the recording data is judged as the one to be processed on an element-by-element basis. The recording data transmitter 15 is thus set to the recording element transfer mode. The recording data for each element is now transferred to the recording device 2 on an element-by-element basis without no delineation between colors. The recording device 2 stores in its buffer 21 the recording data that is coming in on an element-by-element basis.

After the recording data is transferred at step ST 6, the sequence goes to step ST 7. At step ST 7, a determination is made of whether or not the transfer of the recording data is completed. If yes, the transfer of the recording data ends, and the assembling of the recording data for the next cycle starts. If no, a command is issued to continue the transfer of the recording data.

In comparison with the prior art, the memory requirement of the above embodiment of the present invention is small as follows. Suppose that an eight-inch width recording is performed in a resolution of 600 dpi with the 240-dot recording head 25 and the three color ink ribbons, the memory capacity the input device 1 needs is:

600×8×3=144000 bytes

This size of memory is substantially small compared to the memory size the prior art recording memory transfer method requires, and is commonly available in ordinary input devices 1.

Thus, even when the capacity of the memory 14 in the input device 1 is not sufficient enough to store the recording data of one cycle of the three color ink ribbons, there is no need for the addition of a new memory 14 for brief storage of the recording data. The recording data is directly transferred to the recording device 2 to be stored in the buffer 21. This arrangement eliminates the extra time for writing to and reading from the new memory 14. The time from input of the recording data to its actual recording is shortened and thus the slowdown of the effective recording speed is prevented.

In the above embodiment of the method of transferring the recording data to the recording device, a single cycle of recording simultaneously covers a plurality of lines rather than a single line. However, the same method as above may be used in the transfer of the recording data when a single cycle of recording covers only a single line of recording.

The present invention is applicable not only to the color recording device but also to a monochrome recording device. In this case, the recording data is not assembled on a color-by-color basis, but assembled on the assumption that the ink ribbon is a single-color ink ribbon. For example, the memory capacity determining block 11 determines whether the memory 14 in the input device 1 has a capacity sufficient enough to store the recording data of a single cycle of a single color ink ribbon. The recording data, as the one for the single color, is then sent to the recording device 2.

The present invention is not limited to the above embodiment, and modifications are possible within the scope of the present invention.

The above embodiment has been described with reference to the recording data transfer method for the recording device 2 using an ink ribbon. Alternatively, the present invention may be applied to a recording device using a heat transfer mechanism, a recording device using an ink jet mechanism, a laser printer, or the like.

According to the recording data transfer method for the recording device of the present invention, as described above, even when the quantity of the recording data is in excess of the memory capacity of the input device, the processing speed from input of the recording data to actual recording, namely the effective recording speed, is prevented from slowing down, because the recording data is directly to fed to the buffer of the recording device without being stored in the memory of the input device.

What is claimed is:

1. A method of transferring recording data for transferring the recording data from an input device to a recording device, in which a cycle of recording is performed by moving in the direction of scanning a recording head having a plurality of recording elements arrayed in the direction of subscanning, said method comprising the steps of determining the available memory capacity of the input device, transferring to the recording device the recording data of one cycle of recording by the recording head on a cycle-by-cycle basis when the memory capacity of the input device is greater than the quantity of the recording data of one cycle of recording by the recording head, and transferring sequentially to the recording device the recording data by one recording element on an element-by-element basis when the memory capacity of the input device is smaller than the quantity of the recording data of one cycle of recording by the recording head.

2. The method of transferring the recording data to the recording device according to claim 1, wherein the recording device records simultaneously a plurality of lines of recording row in a single recording cycle.

3. A method of transferring recording data for transferring the recording data from an input device to a recording device, in which a cycle of recording is performed by moving in the direction of scanning for each color a recording head having a plurality of recording elements arrayed in the direction of subscanning, said method comprising the steps of determining the available memory capacity of the input device, transferring to the recording device the recording data of one cycle of recording by the recording head on a color-by-color and cycle-by-cycle basis when the memory capacity of the input device is greater than the quantity of the recording data of one cycle of color recording by the recording head, and transferring sequentially to the recording device the recording data of one recording element on an element-by-element basis when the memory capacity of the input device is smaller than the quantity of the recording data of one cycle of color recording by the recording head.

4. The method of transferring the recording data to the recording device according to claim 3, wherein the recording device records simultaneously a plurality of lines of recording row in a single recording cycle.

* * * * *